Sept. 8, 1925.  
J. W. SUMNER  
VEHICLE BRAKING SYSTEM  
Filed Sept. 19, 1922  
1,552,584  
3 Sheets-Sheet 2

WITNESS:

INVENTOR.
James W. Sumner
BY
his ATTORNEYS.

Sept. 8, 1925.  
J. W. SUMNER  
1,552,584  
VEHICLE BRAKING SYSTEM  
Filed Sept. 19, 1922  
3 Sheets-Sheet 3
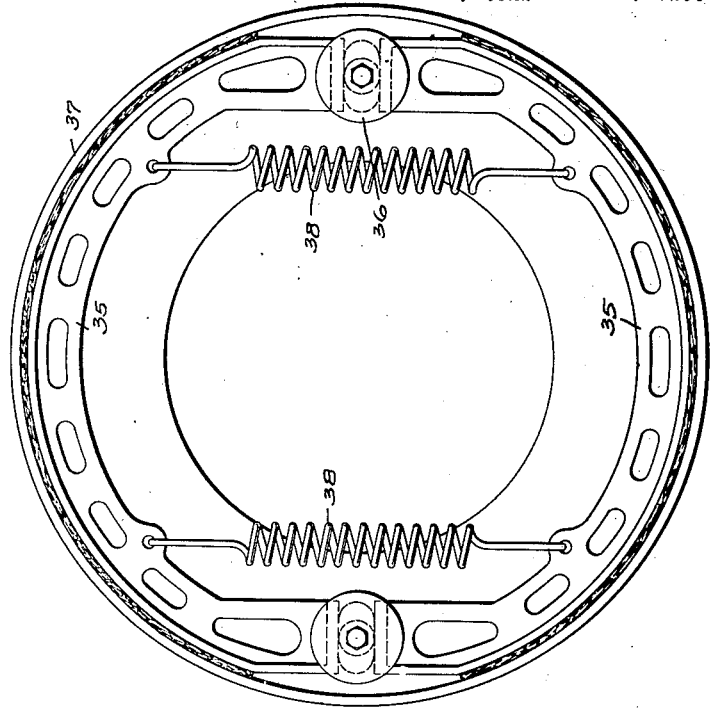
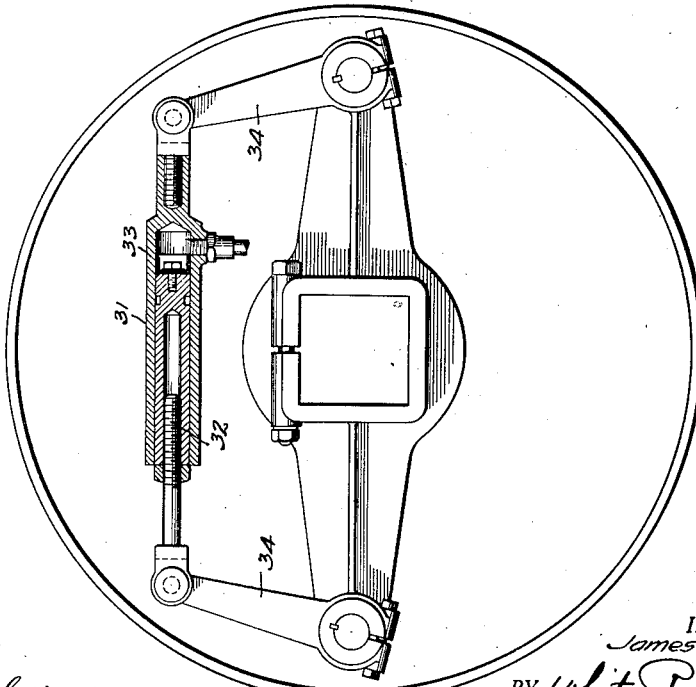
WITNESS:  
H. Sherburne
INVENTOR.  
James W. Sumner  
BY White Prost & Evans  
his ATTORNEYS.

Patented Sept. 8, 1925.

1,552,584

UNITED STATES PATENT OFFICE.

JAMES WAYNE SUMNER, OF SUNNYVALE, CALIFORNIA, ASSIGNOR TO EMORY WINSHIP, OF SAN FRANCISCO, CALIFORNIA.

VEHICLE BRAKING SYSTEM.

Application filed September 19, 1922. Serial No. 589,102.

*To all whom it may concern:*

Be it known that I, JAMES WAYNE SUMNER, a citizen of the United States, and a resident of Sunnyvale, Santa Clara County, State of California, have invented a certain new and useful Vehicle-Braking System, of which the following is a specification.

The invention relates to a vehicle braking system and particularly to a braking system for road vehicles such as motor trucks and road trains.

An object of the invention is to provide a simple and efficient braking system for road trains or coupled motor vehicle and trailers which permit the ready coupling and uncoupling of the vehicles of the train without disturbing the brake system.

A further object of the invention is to provide a braking system for motor vehicles wherein air under pressure is the controlling medium, the air operating to produce liquid under pressure, which liquid actuates the brakes.

The invention possesses other advantageous features, some of which, with the foregoing, will be set forth at length in the following description, where I shall outline in full, that form of the invention, which I have selected for illustration in the drawings accompanying and forming part of the present specification. In said drawings, I have shown one specific embodiment of my invention, but it is to be understood that I do not limit myself to such form, since the invention, as set forth in the claims, may be embodied in a plurality of forms. While the invention may be employed with particular advantage in a road train, or a coupled motor truck and one or more trailers, it possesses features of advantage when used on a motor vehicle alone, and I desire it to be understood that it is not limited to use on road trains.

The invention comprises a hydro-pneumatic braking system wherein the brakes are actuated by liquid, preferably oil, under pressure and contained in a closed system, so that there is minimum liability of loss of liquid and wherein the pressure of the oil is controlled by air or gas under pressure. In the particular application of the invention shown herein, the oil is placed under pressure either by mechanical means or by a combination of mechanical means and pneumatic pressure and the pressure of the oil is reduced or released by opposing pneumatic pressure to the mechanical pressure.

In the accompanying drawings;

Fig. 3 is a vertical section through an axle showing a brake housing and the brake actuating mechanism the latter being shown in section.

Fig. 4 is an elevation of the brake.

Figure 1:
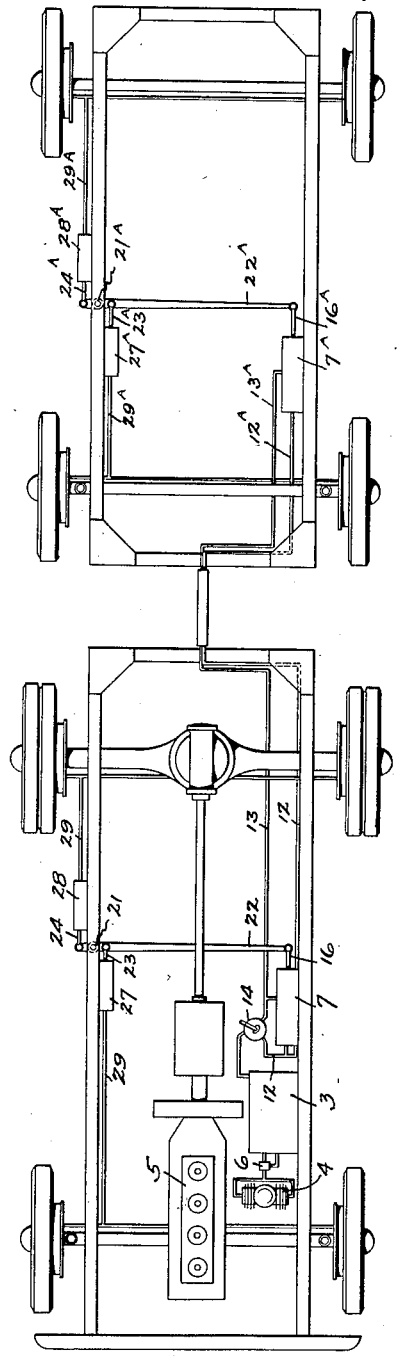
Figure 1 is a plan view, somewhat diagrammatic, of a motor truck or tractor and a coupled trailer, equipped with the braking system of my invention.
Figure 2:
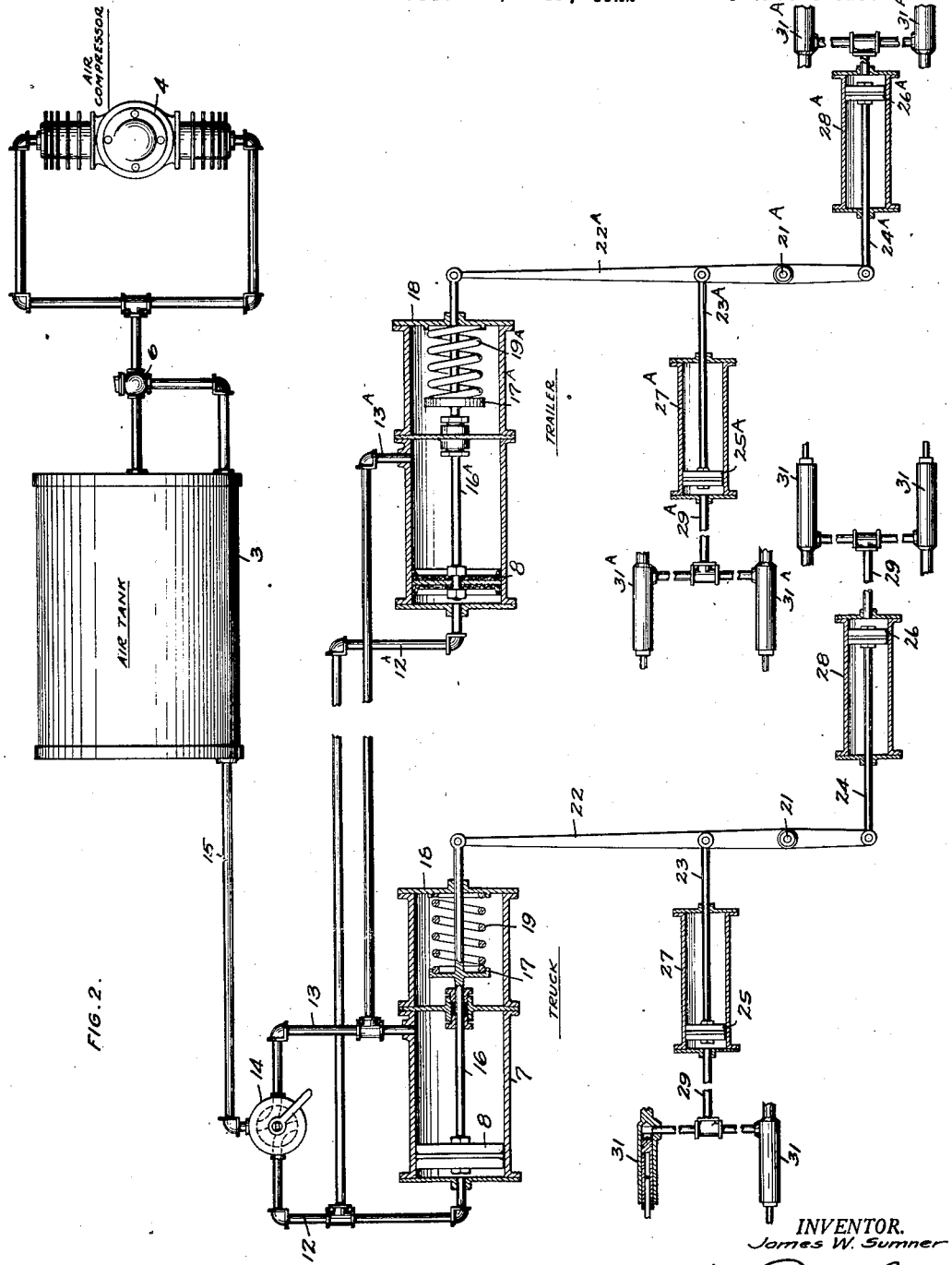
Fig. 2 is a diagrammatic representation of the braking system of a truck and a coupled trailer.

In my prior application, Serial Number 478,798, filed June 20, 1921, for "Vehicle Braking System," I have disclosed a hydropneumatic system in which pneumatic pressure was employed to place oil under pressure, the oil actuating the brakes. In this prior system the oil is placed under pressure by a spring and this pressure is released or controlled by opposing an air pressure to the spring pressure. The brakes were thus applied by spring pressure which may at times be too slow in its action and the object of the present invention is to reinforce the spring pressure with pneumatic pressure so that the brakes may be quickly and positively set when occasion for such action arises. The brake is normally held in released position by the pressure of the air opposing the spring and the release of this air permits the spring to actuate devices which apply the brake. Air is introduced to assist the spring in setting the brakes but should the air pressure fail, the spring will set the brakes.

Arranged on the truck or tractor is a source of air or gas under pressure, usually an air tank or receiver 3 which is supplied with air under pressure by an air pump 4 connected to the motor 5 of the vehicle or by any other suitable means. Interposed between the air pump and the receiver is an unloading valve 6 which limits the maximum pressure which may be produced in the receiver. Arranged on the tractor or truck is a cylinder 7 in which there is disposed a piston 8. Connected to the cylinder on opposite sides of the path of travel of the piston 8 are conduits 12 and 13 which connect through the three-way valve 14 and the conduit 15 with the receiver 3. The three-way valve 14 may be operated to introduce air under pressure into the cylinder 7 either through the conduit 12 or the conduit 13, thus forcing the piston in either direction. Secured to the piston 8 is a piston rod 16 which projects from the cylinder. Secured to the piston rod is a seat 17 and interposed between the seat 17 and the abutment 18 which may be the opposite end of the cylinder is a heavy coil spring 19. This spring operates to force the piston toward the left end of the cylinder as shown in the drawing. Pivoted on a fixed fulcrum on the vehicle frame, as at 21, is a lever 22 which is connected at its end to the piston rod 16 so that movement of the piston is communicated to the lever 22. Connected to the lever 22 at equal distances from the fulcrum 21 are piston rods 23 and 24 to which are secured pistons 25 and 26 operating in cylinders 27 and 28. The cylinders 27 and 28 are preferably arranged adjacent the vehicle wheel and are charged on the discharge side of the piston with oil so that, as the lever 22 is moved to move the pistons 25 and 26 towards the discharge end of their cylinders, oil under pressure is discharged from the cylinders. Connected to each oil cylinder at its discharge end is a conduit 29 which is connected to the brake operating rams 31, there being preferably two rams connected with each oil cylinder. Each ram consists of two relatively movable elements such as the piston or plunger 32 and the cylinder 33 and these elements are extended by the introduction of oil under pressure into the cylinder. The rams 31 are connected at their opposite ends to the brake actuating levers 34, outward movement of which operates to set the brakes and inward movement from their outward position, to release the brakes. In the present construction I have shown a brake consisting of two semi-circular brake shoes 35 having cams 36 disposed between their adjacent ends and normally held apart from the brake drum 37 by springs 38. Outward movement of the arms 34 from their released position causes rotation of the cams 36 on their axes, thus separating the brake shoes and bringing them into frictional contact with the brake drum. Thus, when the lever 22 is actuated to eject oil from the cylinders 27 and 28, the arms 34 are moved outward to apply the brakes. The movement of the lever 22 to set the brakes is caused by the spring 19 or by the combination of the effect of the spring and the introduction of air under pressure into the cylinder 7 on the right hand side of the piston 8. Thus, the apparatus may be actuated to rapidly set the brakes when desired. To release the brakes the valve is operated to release the air pressure from that portion of the cylinder lying on the right hand side of the piston 8 and to introduce air under pressure into that portion of the cylinder lying on the left hand side of the piston 8, thus forcing the piston 8 to the right and moving the lever 22 in a direction to withdraw the oil from the rams. It should be noted that the point of connection of the piston rods 23 and 24 with the lever 22 is closer to the fulcrum than the point of connection of the piston rod 16 so that an oil pressure of large magnitude may be produced.

When it is desired to apply this braking system to a trailer, a cylinder 7$^a$ comparable to the cylinder 7, is secured to the trailer frame and conduits 12$^a$ and 13$^a$ connect the opposite ends of the cylinder with the conduits 12 and 13 so that air under pressure is introduced into the desired end of the piston 7$^a$ at the same time that it is introduced into the piston 7. The conduits 12$^a$ and 13$^a$ are provided with flexible portions which occur between the two vehicles to permit relative movement of the two vehicles, which are usually connected together by a suitable coupling bar or draft bar and the flexible portions are preferably provided with connectors whereby the air lines may be broken readily when it is desired to uncouple the trailer. The cylinder 7$^a$ is provided with a piston 8$^a$, a piston rod 16$^a$, a seat 17$^a$ and a spring 19$^a$ which operate in the same manner as the corresponding parts in the cylinder 7. The piston rod 16$^a$ is connected to a lever 22$^a$ fulcrumed on the trailer frame at 21$^a$ and operating pistons 25$^a$ and 26 in the cylinders 27$^a$ and 28$^a$. From these cylinders oil under pressure is forced into the rams 31$^a$ of the trailer brakes.

Air under pressure is introduced into all of the pneumatic cylinders of the system on opposite sides of the pistons so that the brakes are all simultaneously set to the same degree. When desired, the springs 19, 19$^a$ may be relied on solely to apply the brakes, but when it is desired to bring the road train to a quick stop, the valve 14 may be operated to introduce air into the cylinders 7, 7$^a$ to reinforce the action of the springs.

I claim:

1. The combination with a vehicle brake, of a device operable by liquid under pressure to actuate said brake, mechanical and pneumatic means for placing said liquid under pressure to set said brake and pneumatic means for relieving said pressure, to release the brake.

2. The combination with a vehicle brake, of a device operable by liquid under pressure to actuate said brake, pneumatically operated means for producing and relieving said pressure and a spring cooperating with said pneumatically operated means for producing said pressure.

3. The combination with a vehicle brake, of a liquid operated device connected to said brake, a cylinder connected to said device, a piston in said cylinder, a second cylinder, a piston in the second cylinder connected to said first piston, means for introducing air under pressure into the second cylinder on either side of the piston therein and a spring forcing said latter piston in one direction.

4. The combination with a road vehicle, of a plurality of brakes thereon, a liquid operated device associated with each brake, a liquid containing chamber, conduits connecting said devices with said chamber, a spring tending to force liquid from said chamber into said devices and pneumatically operated means adapted to oppose or reinforce the action of said spring.

5. The combination with a tractor and a trailer connected thereto, of brakes on said trailer, a liquid operated device associated with each brake, a liquid containing chamber on the trailer, conduits connecting said devices and said chamber, a spring tending to force liquid from said chamber into said devices to set the brakes, pneumatically operated means carried by the trailer and adapted to oppose or reinforce the action of the spring and means on the tractor for controlling said pneumatically operated means.

6. The combination with a tractor and a trailer connected thereto, of a brake on the trailer, a device operable by liquid under pressure to actuate said brake, pneumatically operable means on the trailer for placing said liquid under pressure and for relieving said pressure and means on the tractor for controlling said pneumatically operated means.

In testimony whereof, I have hereunto set my hand.

JAMES WAYNE SUMNER.